(12) United States Patent
Bowman et al.

(10) Patent No.: US 9,870,842 B2
(45) Date of Patent: Jan. 16, 2018

(54) RAPIDLY CURABLE ELECTRICALLY CONDUCTIVE CLEAR COATINGS

(71) Applicant: PPG Industries Ohio, Inc., Cleveland, OH (US)

(72) Inventors: Mark P. Bowman, New Kensington, PA (US); Lawrence G. Anderson, Allison Park, PA (US); Gordon L. Post, Pittsburgh, PA (US)

(73) Assignee: PPG industries Ohio, Inc., Cleveland, OH (US)

( * ) Notice: Subject to any disclaimer, the term of this patent is extended or adjusted under 35 U.S.C. 154(b) by 977 days.

(21) Appl. No.: 13/915,795

(22) Filed: Jun. 12, 2013

(65) Prior Publication Data

US 2014/0370268 A1    Dec. 18, 2014

(51) Int. Cl.
  *H01B 1/20* (2006.01)
  *H05B 3/02* (2006.01)
  *B05D 3/06* (2006.01)
  *C09D 5/24* (2006.01)
  *C09D 7/12* (2006.01)
  (Continued)

(52) U.S. Cl.
  CPC ............... *H01B 1/20* (2013.01); *C01G 41/02* (2013.01); *C08J 7/042* (2013.01); *C08J 7/047* (2013.01); *C08K 3/22* (2013.01); *C09D 5/24* (2013.01); *C09D 7/1275* (2013.01); *H01B 1/08* (2013.01); *H05B 3/02* (2013.01); *B05D 3/0263* (2013.01); *B05D 7/02* (2013.01); *C01P 2004/54* (2013.01); *C01P 2004/62* (2013.01); *C08J 2369/00* (2013.01); *C08J 2400/24* (2013.01); *C08J 2475/04* (2013.01); *C08K 2003/2258* (2013.01);
  (Continued)

(58) Field of Classification Search
  CPC .................. H01B 1/20; C08K 2003/2258
  See application file for complete search history.

(56) References Cited

U.S. PATENT DOCUMENTS 4,421,677 A   12/1983   Bianchin et al.
5,137,575 A    8/1992   Yasuki et al.
(Continued)

FOREIGN PATENT DOCUMENTS

EP   1676890 A1    7/2006
EP   2 657 202 A1   10/2013
(Continued)

OTHER PUBLICATIONS

Liu et al. (Preparation and Characterization of WO2.50 Flakes assembled from Nanoparticles and Its Application in Conductive Coating, Chinese Journal of Applied Chemistry. 24(4), pp. 439-442 (2007)).*

(Continued)

*Primary Examiner* — Alexandre F Ferre
(74) *Attorney, Agent, or Firm* — Alan G. Towner

(57) ABSTRACT

Rapidly curable electrically conductive clear coatings are applied to substrates. The electrically conductive clear coating includes to clear layer having a resinous binder with ultrafine non-stoichiometric tungsten oxide particles dispersed therein. The clear coating may be rapidly cured by subjecting the coating to infrared radiation that heats the tungsten oxide particles and surrounding resinous binder. Localized heating increases the temperature of the coating to thereby thermally cure the coating, while avoiding unwanted heating of the underlying substrate.

27 Claims, 2 Drawing Sheets

(51) Int. Cl.
*C08K 3/22* (2006.01)
*C01G 41/02* (2006.01)
*H01B 1/08* (2006.01)
*C08J 7/04* (2006.01)
*B05D 7/02* (2006.01)
*B05D 3/02* (2006.01)

(52) U.S. Cl.
CPC ...... *Y10T 428/25* (2015.01); *Y10T 428/31507* (2015.04); *Y10T 428/31609* (2015.04)

(56) References Cited

U.S. PATENT DOCUMENTS

| | | | |
|---|---|---|---|
| 5,908,585 A * | 6/1999 | Shibuta | H01B 1/14 |
| | | | 252/506 |
| 7,258,706 B2 | 8/2007 | Kambe et al. | |
| 7,547,431 B2 | 6/2009 | Yadav et al. | |
| 7,559,494 B1 | 7/2009 | Yadav et al. | |
| 7,708,974 B2 | 5/2010 | Yadav | |
| 7,816,006 B2 | 10/2010 | Yadav et al. | |
| 8,105,742 B2 * | 1/2012 | Norikane | B01J 2/04 |
| | | | 425/6 |
| 8,324,300 B2 | 12/2012 | Adochio et al. | |
| 2003/0158316 A1 | 8/2003 | Vanier et al. | |
| 2004/0139888 A1 | 7/2004 | Yadav et al. | |
| 2006/0178254 A1 | 8/2006 | Takeda et al. | |
| 2006/0181774 A1 | 8/2006 | Ojima et al. | |
| 2006/0251996 A1 | 11/2006 | Bogerd et al. | |
| 2006/0262260 A1 * | 11/2006 | Majumdar | G02F 1/1334 |
| | | | 349/122 |
| 2007/0187653 A1 | 8/2007 | Takeda et al. | |
| 2009/0184637 A1 | 7/2009 | Yukinobu et al. | |
| 2010/0184901 A1 * | 7/2010 | Adochio | B82Y 30/00 |
| | | | 524/406 |
| 2010/0210450 A1 | 8/2010 | Yadav | |
| 2010/0210772 A1 | 8/2010 | Hiwatashi | |
| 2010/0310787 A1 | 12/2010 | Lehmann et al. | |

FOREIGN PATENT DOCUMENTS

| | | |
|---|---|---|
| JP | 2006219662 A | 8/2006 |
| JP | 2008024902 A | 2/2008 |
| JP | 2008077942 A * | 4/2008 |
| JP | 2008150548 A | 7/2008 |
| JP | 2008156386 A | 7/2008 |
| JP | 2008214554 A | 9/2008 |
| WO | 2005037932 A1 | 4/2005 |

OTHER PUBLICATIONS

Machine translation JP 2008-077942. (2008).*
Niklasson, Gunnar A., "Polaron Absorption in Tungsten Oxide Nanoparticle Aggregates", Electrochimica Acta 46 (2001), Department of Materials Science, The Angstrom Laboratory, Uppsala University, Aug. 23, 2000, pp. 1967-1971.
Database CA (Online) Chemical Abstracts Service, Columbus, OH; May 9, 2007, Liu, Jin-Ku et al: "Preparation and Characterization of WO2.50 Flakes Assembled from Nanoparticles and its Application in Conductive Coating", XP002726404.
PCT Search Report, PCT/US2014/033286, dated Jul. 11, 2014.

* cited by examiner

RAPIDLY CURABLE ELECTRICALLY CONDUCTIVE CLEAR COATINGS

GOVERNMENT CONTRACT

This invention was made with United States government support under Contract Number RES100058 awarded by the Department of Energy. The United States government has certain rights in this invention.

FIELD OF THE INVENTION

The present invention relates to rapidly curable electrically conductive clear coatings that may be applied to substrates such as polycarbonate substrates or other substrates.

BACKGROUND INFORMATION

Many types of clear coatings have traditionally been applied to various types of substrates. In certain instances, the underlying substrate may comprise a relatively low melting point material that does not allow the applied clear coat to be cured at high temperatures. For example, aircraft canopies are often made from clear polymeric materials such as polycarbonate that may be degraded when subjected to high temperatures. As a result, conventional thermal curing of clear coat compositions at high temperatures may not be possible or practical for such substrates. The thermal curing temperature may be reduced to a level that does not damage the substrate, but the use of low curing temperatures can result in cure times of several hours or even days. It would therefore be desirable to reduce the cure times of clear coat compositions that are applied to polycarbonate substrates or other similar substrates.

SUMMARY OF THE INVENTION

An aspect of the invention provides a coated substrate comprising a substrate, and a rapidly curable electrically conductive clear coating over at least a portion of the substrate, wherein the coating comprises at least one clear layer comprising a binder, and ultrafine non stoichiometric tungsten oxide particles dispersed in the binder.

Another aspect of the invention provides a method of applying an electrically conductive clear coating on a substrate comprising applying a clear coating composition comprising a binder and ultrafine non-stoichiometric tungsten oxide particles onto the substrate, and subjecting the applied clear coating composition to infrared radiation to thereby heat and thermally cure the clear coating composition.

A further aspect of the invention provides a method of curing a clear coating composition applied to a substrate, the method comprising subjecting the clear coating composition to infrared radiation to thereby heat the clear coating composition to a curing temperature of at least 50° C. while maintaining the substrate at a temperature at least 10° C. less than the curing temperature of the clear coating composition, wherein the resultant coated substrate has a surface resistance, of less than $1.0 \times 10$ Ω/square.

DETAILED DESCRIPTION

Figure 1:
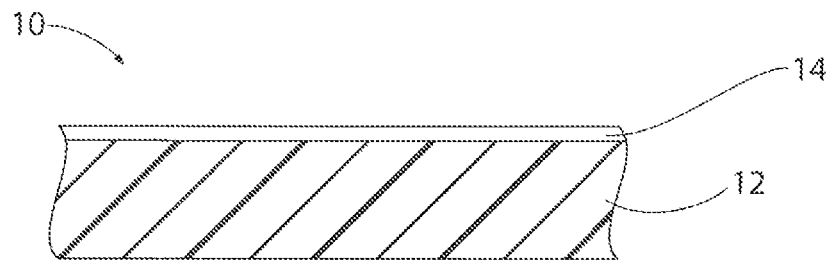
FIG. 1 is a partially schematic side sectional view of a substrate coated with a rapidly cured electrically conductive clear coating in accordance with an embodiment of the present invention.

In accordance with embodiments of the present invention, electrically conductive clear coatings are applied onto substrates and then rapidly cured. At least one layer of the electrically conductive clear coating comprises a clear coating material including a resinous binder with ultrafine non-stoichiometric tungsten oxide particles dispersed therein. The non-stoichiometric tungsten oxide particles absorb a certain amount of infrared radiation, and curing of the clear coating may be achieved by subjecting the coating to infrared radiation that heats the particles to thereby heat the surrounding resinous binder. Such localized heating increases the temperature of the coating to thereby thermally cure the coating, while avoiding unwanted heating of the underlying substrate or underlying coatings.

The clear coating compositions comprising non-stoichiometric tungsten oxide particles described herein can result in faster curing compared to the curing of coatings without using such tungsten oxide particles. As used herein, when referring to a clear coating comprising ultrafine non-stoichiometric tungsten oxide particles dispersed in a resinous binder, the terms "rapidly cure" and "rapidly curable" mean that the clear coating thermally cures in a shorter period of time upon exposure to infrared radiation in comparison to a similar coating and is exposed to the same amount of infrared radiation that does not contain such non-stoichiometric tungsten oxide particles. For example, the curing time may be at least 10 percent less or 20 percent less. In certain embodiments, the curing tune may be 60 percent less or 80 percent less.

In accordance with certain embodiments, the clear coating compositions are cured within controlled temperature parameters that result in suitable thermal curing of the clear coating layer or layers, while avoiding thermal damage to the underlying substrate or to any underlying coating layers that may be heat sensitive. For example, the temperature of the clear coating during exposure to infrared radiation may range from up to 180° C., e.g., from above ambient to 150° C., or from 50 to 125° C., while the temperature of the underlying substrate may be at least 10° C. less than the temperature of the clear coating layer, for example, at least 20° C. or 30° C. or 60° C. less than the temperature of the clear coating layer.

Certain embodiments of the present invention are directed to electrically conductive clear coatings that are clear, e.g., transparent and colorless. As used herein, a coating is "clear" if it is transparent and colorless. As used herein, a coating is "transparent" if it has a luminous transmission in the visible region (400 to 800 nanometers) of at least 85 percent, such as at least 90 percent, or, in some cases, at least 95 percent of the incident light and is substantially free of haze to the human eye. As used herein, a coating is "colorless" if the human eye does not observe the coating as having a significant amount of a colored tone, e.g., there would be little or no blue, yellow or pink tones in the observed coating. For example, in certain embodiments, this would require that the coating not absorb significantly more strongly in one or more 25-50 nanometer ranges of the visible portion of the electromagnetic spectrum (400 to 800 nanometers) than in other 25-50 nanometer ranges within the visible portion of the electromagnetic spectrum, although small percentage variations are tolerable. This may be exemplified by having an optical density of less than 0.2, such as less than 0.1, or, in some cases, less than 0.05, in a. 50 nanometer range in the visible portion of the electromagnetic spectrum. These kinds of measurements can readily be taken by densitometers in transmissive mode.

In certain embodiments, the electrically conductive clear coatings do not totally block or shield the transmission of near infrared radiation, e.g., in the range of 800 to 2000 nanometers. The electrically conductive coatings may allow at least 20 percent transmission of near-IR radiation throughout the range of near-IR wavelengths, for example, at least 25 or 30 percent transmission. Thus, in this embodiment, the electrically conductive clear coating does not totally block near-infrared radiation and is not considered to be an infrared-shielding material.

The coatings of the present invention include at least one layer that is electrically conductive. As used herein, the term "electrically conductive" means that one or more layers of the coating has a surf ac resistivity of less than $1.0 \times 10^{10}$ $\Omega$/square, typically less than $1.0 \times 10^9$ $\Omega$/square. In certain embodiments, the electrically conductive clear coating has a surface resistivity of from $1.0 \times 10^8$ to $1.0 \times 10^4$ $\Omega$/square, for example, from $1.0 \times 10^6$ to $1.0 \times 10^5$ $\Omega$/square.

FIG. 1 is a side sectional view schematically illustrating a coated substrate 10 in accordance with an embodiment of the present invention. The coated substrate 10 includes a substrate 12 having a rapidly curable electrically conductive clear coating 14 applied thereto.

In certain embodiments, the substrate 12 is made of a polymeric material such as polycarbonate, polystyrene, polyamides, polyesters, polyethylene, polypropylene, melamine resins, polyaciylates, polyacrylonitrile, polyurethanes, polyvinyl chloride, polyvinyl alcohols, polyvinyl acetates and polyvinylpyrrolidones, and the like.

In certain embodiments, the substrate 12 may comprise glass. The glass may be uncoated or coated. For example, while the glass itself may not be particularly heat-sensitive, it may have one or more coatings that could be damaged by exposure to high curing temperatures associated with conventional clear coatings. The rapidly curable clear coatings of the present invention may advantageously be applied to such types of coated glass substrates without damaging the coatings or the underlying glass.

As shown in the embodiment of FIG. 1, the rapidly curable electrically conductive clear coating 14 is provided as a single layer on the substrate 12. The clear coating 14 may have any desired dry film thickness, such as from 0.1 micron to 1 mm, typically from 1 micron to 100 microns, or from 2 to 50 microns, or from 3 to 25 microns. The clear coating 14 may include a resin or binder, as more fully described below.

In accordance with embodiments of the present invention, the clear coating 14 is rapidly curable due to the presence of ultrafine non-stoichiometric tungsten oxide particles dispersed in the clear coating layer 14, as more fully described below. Furthermore, the protective clear coating 14 shown in FIG. 1 may be electrically conductive. The clear coating 14 may be made electrically conductive by incorporating known materials such as indium tin oxide, antimony tin oxide, graphene, quaternary ammonium salts, conduction polymers, carbon nanotubes and the like within the layer 14 in sufficient amounts to achieve the desired level of electrical conductivity while maintaining acceptable levels of transparency.

Figure 2:
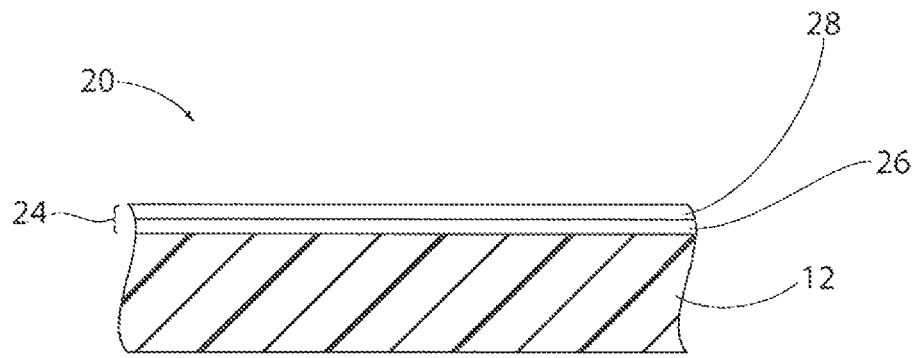
FIG. 2 is a partially schematic side sectional view of a substrate coated with a rapidly cured electrically conductive clear coating in accordance with another embodiment of the present invention.

FIG. 2 schematically illustrates another coated substrate 20 in accordance with an embodiment of the present invention. The coated substrate 20 may include a substrate 12 similar to that described in the embodiment of FIG. 1. In the embodiment shown in FIG. 2, a rapidly curable electrically conductive clear coating 24 comprises a clear electrically conductive layer 26 applied to the substrate 12, and a rapidly curable protective clear coating 28 applied to the electrically conductive coating 26.

The clear electrically conductive coating 26 may comprise any suitable known material such as indium tin oxide, antimony tin oxide, and the like. The electrically conductive coating 26 may have a dry film thickness of from 0.1 to 100 microns.

The rapidly curable clear coating 28 includes ultra fine non-stoichiometric tungsten oxide particles in accordance with embodiments of the present invention. The dry film thickness of the rapidly curable clear coating 28 may typically range from 0.1 to 100 microns, for example, from 2 to 50 microns or from 3 to 25 microns.

Figure 3:
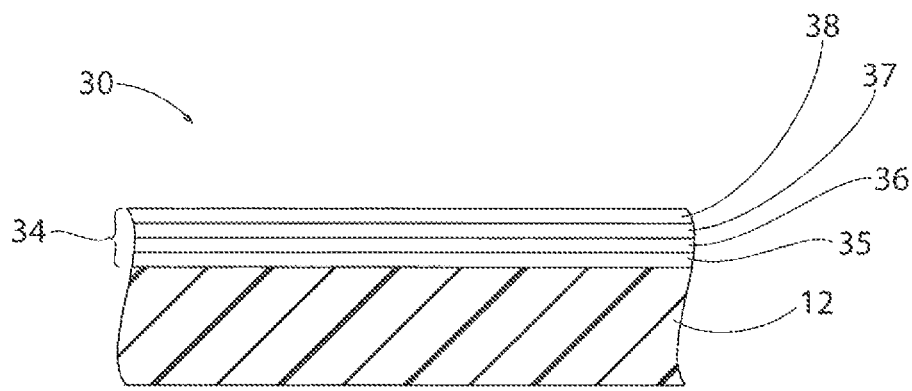
FIG. 3 is a partially schematic side sectional view of a substrate coated with a rapidly cured electrically conductive clear coating in accordance with a further embodiment of the present invention.

FIG. 3 schematically illustrates another coated substrate 30 in accordance with an embodiment of the present invention. The coated substrate 30 includes a rapidly curable electrically conductive clear coating 34, which comprises a primer layer 35 applied to the substrate 12, a transition layer 36 applied to the primer layer 35, an electrically conductive layer 37 applied to the transition layer 36, and a rapidly curable clear coating 38 applied to the electrically conductive layer 37.

In certain embodiments, the primer layer 35 may comprise organofunctional silanes, siloxanes, acrylates and the like. The thickness of the primer layer 35 may typically range from 0.1 to 20 microns. The transition layer 36 may comprise a relatively soft material that accommodates any mismatch between the coefficients of thermal expansion of the substrate 30 and the electrically conductive layer 37. Examples of suitable transition layer materials include silanes, urethanes, acrylics and the like. The thickness of the transition layer 36 may typically range from 0.1 to 40 microns. The electrically conductive layer 37 may be similar to the electrically conductive layer 26 in the embodiment of FIG. 2. The rapidly curable clear coating layer 38 may be similar to the protective clear coating 28 in the embodiment of FIG. 2.

The clear coating layers, such as those described in the embodiments of FIGS. 1-3, may comprise a binder. As used herein, the term "binder" refers to a continuous or film-forming material such as a resin comprising, for example, thermoplastic compositions, thermosetting compositions, radiation curable compositions, as well as compositions comprising a metal alkoxide. The resins may be provided in coating compositions that are water-based or solvent-based liquid compositions, or, alternatively, in solid particulate form, i.e., a powder compositions.

In certain embodiments, the resinous binder included within the clear coating layers of the present invention comprises a thermosetting resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced by heat. In certain embodiments, the resins and coatings do not include reactive components that are polymerized by exposure to infrared radiation. The application of infrared radiation raises the temperature of the non-stoichiometric tungsten oxide containing layer(s) to thereby increase the rate at which the thermoset components cures.

Thermosetting resins suitable for use in the compositions, such as coating compositions, of the present invention include, for example, those formed from the reaction of a polymer having at least one type of reactive group and a curing agent having reactive groups reactive with the reactive group(s) of the polymer. As used herein, the term "polymer" is meant to encompass oligomers, and includes, without limitation, both homopolymers and copolymers. The polymers can be, for example, acrylic, saturated or unsaturated polyester, polyurethane, polyether, polyvinyl, cellulosic, acrylate, silicon-based polymers, co-polymers thereof, and mixtures thereof, and can contain reactive groups such as epoxy, carboxylic acid, hydroxyl, isocyanate, amide, carbamate and carboxylate groups, among others, including mixtures thereof. In one embodiment, the polymer resin may comprise a two part isocyanate.

Suitable acrylic polymers include, for example, those described in United States Patent Application Publication 2003/0158316 A1 at [0030]-[0039], the cited portion of which being incorporated herein by reference. Suitable polyester polymers include, for example, those described in United States Patent Application Publication 2003/0158316 A1 at [0040]-[0046], the cited portion of which being incorporated herein, by reference. Suitable polyurethane polymers include, for example, those described in United States Patent Application Publication 2003/0158316 A1 at [0047]-[0052], the cited portion of which being incorporated herein by reference. Suitable silicon-based polymers are defined in U.S. Pat. No. 6,623,791 at col. 9, lines 5-10, the cited portion of which being incorporated herein by reference.

In other embodiments, the film-forming resin included within the coating compositions of the present invention comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., *Organic, Polymer Chemistry*, pp. 41-42, Chapman and Hall, London (1973). Suitable thermoplastic resins include polycarbonates, polyesters, polyamides, polyolefins, polystyrenes, vinyl polymers, acrylic polymers and copolymers and blends thereof.

In certain embodiments, the binder is present in the rapidly curable clear coatings in an amount of at least 10 percent by weight, such as at least 30 percent by weight, at least 50 percent by weight, at least 90 percent by weight, or, in some cases, at least 95 percent by weight, at least 99 percent by weight, or, in yet other cases, at least 99.9 percent by weight, or at least 99.95 percent by weight. In certain embodiments, the hinder is present in the compositions of the present invention in an amount of no more than 99.99 percent by weight, such as no more than 99.9 percent by weight, no more than 99 percent by weight or no more than 90 percent by weight. The amount of the binder present in the rapidly curable clear coatings of the present invention can range between any combination of the recited values inclusive of the recited values.

The rapidly curable clear coatings of the present invention comprise ultrafine non-stoichiometric tungsten oxide particles dispersed in the binder. For example, the non-stoichiometric tungsten oxide particles may be uniformly dispersed throughout the thickness of at least one layer of the clear coating. As used herein, the term "non-stoichiometric" refers to metastable materials which have a composition that is different than that required for stoichiometric bonding between two or more elements, such as is described in U.S. Pat. No. 6,344,271 ("the '271 patent") at col. 9, line 13 to col. 10, line 45, the cited portion of which being incorporated herein by reference. As described in the '271 patent, stoichiometric bonding between two or more elements indicates that charge balance is achieved among the elements. In general, therefore, stoichiometric tungsten oxide is $WO_3$.

In certain embodiments of the present invention, the non-stoichiometric tungsten oxide particles are of the general formula $WO_x$ where $2.2 \leq x \leq 2.99$, such as $2.65 \leq x \leq 2.95$. In some embodiments, the non-stoichiometric tungsten oxide particles are of the formula $WO_{2.72}$ or $WO_{2.9}$. In certain embodiments of the present invention, the tungsten oxide particles are of the general formula $M_xW_yO_z$, where M is one or more elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, Be, Hf, Os, Bi, and I; W is tungsten; 0 is oxygen; $0.001 \leq x/y \leq 1$, such as $0.001 \leq x/y \leq 0.1$ and $2.2 \leq z/y \leq 2.99$, such as $2.65 \leq z/y \leq 2.95$. In some embodiments, where the non-stoichiometric tungsten oxide particles are of the general formula $M_xW_yO_z$, z/y is 2.72 or 2.9. Such tungsten oxide particles are described in United States Patent Application Publication No. 2006/0178254 A1 at [0071] to [0087], the cited portion of which being incorporated herein by reference.

In certain embodiments, the ultrafine non-stoichiometric tungsten oxide particles may have an average primary particle size of DO more than 1,500 nanometers. For example, the tungsten oxide particles may have an average primary particle size of no more than 200 nanometers, no more than 150 nanometers, no more than 100 nanometers, such as no more than 50 nanometers, or, in certain embodiments, no more than 30 nanometers, as determined by visually examining a micrograph of a transmission electron microscopy ("TEM") image, measuring the diameter of the particles in the image, and calculating the average primary particle size of the measured particles based on magnification of the TEM image, One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle as opposed to an agglomeration of two or more individual particles.

In certain embodiments, the non-stoichiometric tungsten oxide particles described above have a shape or morphology that is generally equiaxed or substantially spherical. As used herein, the term "substantially spherical" refers to particles that have an average aspect ratio of no more than 4:1, such as no more than 3:1, in some cases no more than 2:1, and, in yet other cases no more than 1.5:1, 1.2:1 or 1.1:1.

The nonstoichiometric tungsten oxide particles that are included in the compositions of the present invention may be prepared by various methods known to those skilled in the art, including gas phase synthesis processes, such as, for example, flame pyrolysis, hot walled reactor, chemical vapor synthesis, among other methods, in certain embodiments, however, such particles are prepared by reacting together one or more organometallic and/or metal oxide precursors in a fast quench plasma system. In certain embodiments, the particles may be formed in such a system by (a) introducing materials into a plasma chamber; (b) rapidly heating the materials by means of a plasma to yield a gaseous product stream; (c) passing the gaseous product stream through a restrictive convergent-divergent nozzle to effect rapid cooling and/or utilizing an alternative cooling method, such as a cool surface or quenching stream, and (d) condensing the gaseous product stream to yield ultrafine solid particles. Certain suitable fast quench plasma systems and methods for their use are described in U.S. Pat. Nos. 5,749,937, 5,851,507, 5,935,293, 5,788,738, 5,984,997, 6,602,595 and RE37,853 E and U.S. Patent Application Publication No. 2006/0099146, which are incorporated herein by reference. The non-stoichiometric tungsten oxide particles may also be produced by a method described in United States Patent Application Publication No. 2006-0178254 A1 at [0088] to [0100], the cited portion of which being incorporated herein by reference.

In other embodiments, the non-stoichiometric tungsten oxide particles are made by a wet chemistry method, such as, for example, sol-gel processes, precipitation processes, wet grinding processes, inverse-micelle methods, and combinations of these processes. See, e.g., Beck and Siegel, "The Dissociative Adsorption of Hydrogen Sulfide over Nanophase Titanium Dioxide," *J. Mater. Res.*, 7, 2840 (1992), and Steigerwald and Brus, "Synthesis, Stabilization, and Electronic Structure of Quantum Semiconductor Nanoclusters," *Ann. Rev. Mater. ScL,* 19, 471 (1989).

Reduced forms of non-stoichiometric tungsten-oxide can also be prepared by various methods. In some embodiments, the reduced form of non-stoichiametric tungsten-oxide can be produced in situ by the methods described above via the introduction of a reducing material. In other embodiments, non-stoichiometric tungsten particles can be post processed in a reducing atmosphere such as a fluidized bed reactor and the like.

In the rapidly curable protective clear coatings of the present invention, the non-stoichiometric tungsten oxide particles are typically present in the composition in an amount of greater than 200 ppm, for example, greater than 300, 400, 500 or 550 ppm. In certain embodiments, the non-stoichiometric tungsten oxide particles comprise less than 5,000 or 4,000 or 3,000 ppm, e.g., less than 2,000 or 1,000 ppm. In certain embodiments where high levels of transparency in the visible region are desired, the amount of non-stoichiometric tungsten oxide particles may be less than 900 or 800 ppm.

In certain embodiments, the coating compositions of the present invention may also comprise other IR absorbing particles such as indium tin oxide, antimony fin oxide, titanium nitride, lanthanum hexaboride, and the like. Specific examples of suitable particles include, without limitation, any of those described in International Patent Application Publication No. WO 2008/127409, incorporated herein by reference in its entirety, as well as those described in United States Patent Application Publication No 2007/0203279 at [0047] to [0058] U.S. Pat. No. 7,368,523 at col. 5, line 50 to col, 8, line 2, and U.S. Pat. No. 7,300,967 at col. 3, line 23 to col. 5, line 27, the cited portions of which being incorporated herein by reference.

In certain embodiments, the clear coatings of the present invention may comprise one or more other ingredients typically used in coatings such as crystallization aids, impact modifiers, surface lubricants, denesting agents, stabilizers, antioxidants, ultraviolet light absorbing agents, deactivators, nucleating agents, fillers, acetaldehyde reducing compounds, other reheat enhancing aids, and anti-abrasion additives.

In certain embodiments, the clear coatings of the present invention comprise a plasticizer, such as, for example, dihexyl adipate, phosphoric acid ester, phthalic acid ester, and mixtures thereof. In some embodiments, the plasticizer concentration ranges up to 35 percent by weight of the composition.

The clear coating compositions of the present invention may be prepared by any of a variety of techniques. In certain embodiments, the non-stoichiometric tungsten oxide particles may be introduced to the binder by chemical or mechanical methods. For example, the non-stoichiometric tungsten oxide particles may be introduced to a polymeric binder or introduced to monomers before or during their polymerization at a suitable time and location. Furthermore, the non-stoichiometric tungsten oxide particles may be introduced to a polymer or introduced to a monomer by mechanical mixing, shaking, stirring, grinding, ultrasound, etc., with or without the aid of a solvent system.

The clear coating compositions of the present invention can be applied to the substrates by any of a variety of methods including dipping or immersion, flow coating, spin coating, spraying, intermittent spraying, dipping, followed by spraying, spraying followed by dipping, brushing, or roll-coating, among other methods. In certain embodiments, however, the coatings of the present invention are applied by spraying or flew coating and, accordingly, such compositions often have a viscosity that is suitable for application by spraying or flow coating at ambient conditions.

In certain embodiments, the present invention provides methods of rapidly curing the clear coatings using IR energy such as near-IR radiation including wavelengths within a range of from 800 to 2000 nanometers. The IR energy can be applied in any manner, in some embodiments, the IR energy is applied using an IR heat source, such as an IR lamp. IR lamps are commonly used and available to one of skill in the art. The IR energy can also be applied by simply exposing the coating to some other light source. The other light source can be the light emitted by standard incandescent, lights or even sun light. Thus, the IR energy can be supplied in any manner, as long as the IR energy is sufficient to at least partially affect the curing or drying.

The following examples are intended to illustrate various aspects of the invention, and are not intended to limit the scope of the invention. In the following examples, dearcoats with and without additions of nonstoichiometric tungsten oxide particles were evaluated. For the coatings containing the non-stoichiometric tungsten oxide particles, the near-infrued absorbing non-stoichiometric tungsten oxide particles were prepared as follows: 240 grams of reduced tungsten oxide ($WO_{2.72}$ from GTP Corp., Towanda, Pa.) and 360 grams of Solsperse 32500 (Lubrizol, Wickliffe. Ohio) were ground in an Eiger mill at 3500 rpm for one hour with 2.0 mm beads, followed by grinding for eight hours with 0.3 mm beads. This yielded a reduced tungsten oxide dispersion with an average particle size of 110 nm.

Example 1

Four mil wet film thick coatings of an electrically conductive two part isocyanate clearcoat available from PPG Industries, Pittsburgh, Pa. under the designation FX422 were applied on flat, clear, colorless, rectangular, acrylic panels having thicknesses of 7/16 inch. One coating formulation contained no non-stoichiometric tungsten oxide particles, and another coating formulation contained 472 ppm non-stoichiometric tungsten oxide particles prepared as described above. The loading of the non-stoichiometric tungsten oxide particles is based on the total solids content of the coating. It is noted that the FX422 clearcoat normally takes one to two days at ambient temperature to cure. The coated panels were allowed to dry for 5 minutes, giving 2-mil dry film thick coatings. The coated panels were then cured with a near-IR lamp. The near-IR lamp was an Apollo VS Glow heater 367 series with gold foil reflectors, part # VSA00081 (quartz halogen bulb) from Tempco Electric Heater Corp., Wood Dale, Ill. This lamp has a maximum output at 1300-1700 nm. The temperatures of the coatings, the acrylic substrates on the opposite side of the coatings and the uncoated acrylic substrates next to the coatings were measured during the curing operation using an optical pyrometer.

Figure 4:
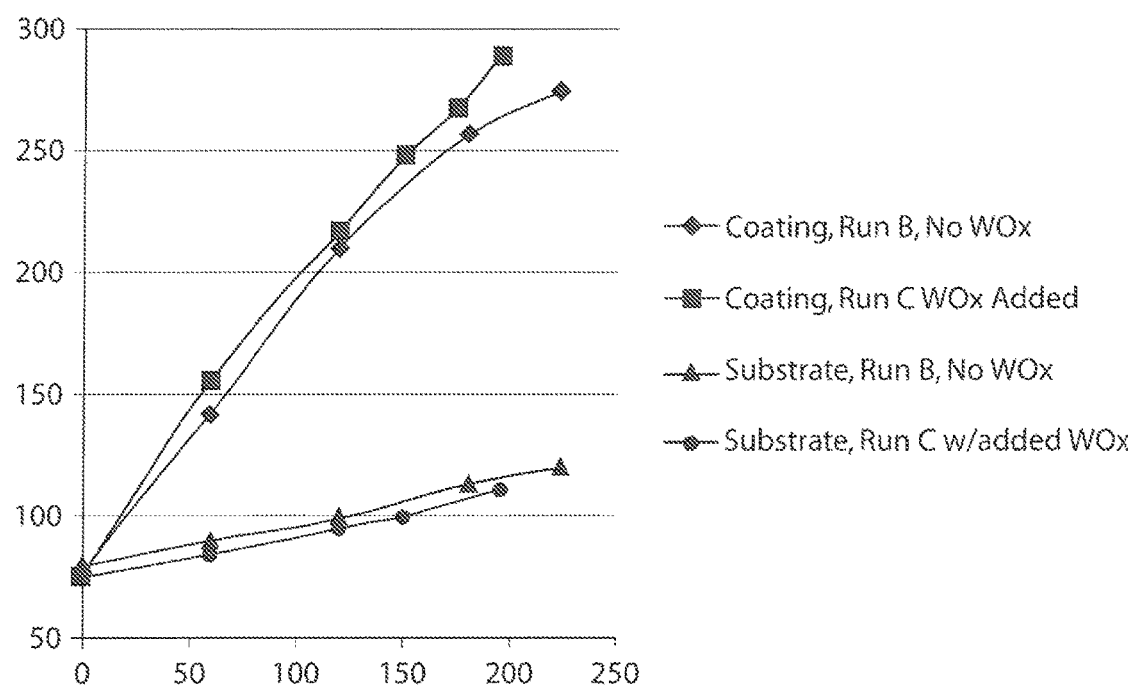
FIG. 4 is a plot of coating and substrate temperatures vs. cure times for various clear coatings during coating operations.

Solvent resistance was checked (MEK or acetone double rubs). In each case, if the coating was marred by the solvent resistance test another panel was made up and baked under the near-IR lamp for increasing amounts of time until it could hold up to 100 double rubs of acetone or MEK. Results are shown in Tables 1 and 2. The results are plotted in FIG. 4, in where the y-axis represents the measured temperatures (° F.) and the x-axis represents the cure time (seconds). As can be seen from Table 1 and 2, FIG. 4 full cure was obtained in 195 seconds for the clearcoat containing the non-stoichiometric tungsten oxide particles versus 223 seconds without the particles. In addition, since the clearcoat containing the non-stoichiometric tungsten oxide particles absorbed more IR energy, the substrate did not heat up as much.

TABLE 1

Clearcoat With No Reduced Tungsten Oxide

| Time (sec.) | Coating Temp (F.) | Bottom Substrate Temp (F.) |
|---|---|---|
| Run A | | |
| 0 | 75 | 75 |
| 65 | 150 | |
| 110 | 200 | 91 |
| 180* | 253 | 111 |
| Run B | | |
| 0 | 79 | 79 |
| 60 | 142 | 90 |
| 120 | 210 | 99 |
| 180 | 257 | 113 |
| 223** | 275 | 120 |

*Lamp turned off at 180 seconds; clearcoat took 50 acetone double rubs before marring.
**Lamp turned of at 223 seconds; clearcoat survived 200 acetone double rubs without any marring.

TABLE 2

Clearcoat With 472 ppm Reduced Tungsten Oxide

| Time (sec.) | Coating Temp. (F.) | Bottom Substrate Temp. (F.) | Top Side Substrate Temp. (F.) |
|---|---|---|---|
| 0 | 75 | 75 | |
| 60 | 156 | 84 | |
| 120 | 217 | 95 | |
| 150 | 248 | 100 | 208 |
| 175 | 268 | 106 | 215 |
| 195* | 289 | 111 | 228 |

TABLE 2-continued

Clearcoat With 472 ppm Reduced Tungsten Oxide

| Time (sec.) | Coating Temp. (F.) | Bottom Substrate Temp. (F.) | Top Side Substrate Temp. (F.) |
|---|---|---|---|

*Lamp turned off at 195 seconds; clearcoat survived 200 acetone double rubs without any marring.

Example 2

Four mil wet film thick coatings of an electrically conductive two part isocyanate clearcoat available from PPG Industries, Pittsburgh, Pa. under the designation FX422 were applied on flat, clear, colorless, rectangular, polycarbonate panels having thicknesses of ¼ inch. One coating formulation contained no non-stoichiometric tungsten oxide particles, another coating formulation contained 1,480 ppm non-stoichiometric tungsten oxide particles, and another coating formulation contained 3,480 ppm non-stoichiometric tungsten oxide particles prepared as described above. The coated panels were allowed to dry for 5 minutes, giving 3-mil dry film thick coatings. The coated panels were then cured with a near-IR lamp in a similar manner as described in Example 1 while measuring the coating and substrate temperatures. Results are shown in Tables 3-5. As can be seen, coating temperatures during the curing operation are significantly increased in the clearcoats containing non-stoichiometric tungsten oxide particles. Table 4 also demonstrates the significant temperature differential between the substrate and the clearcoat during the curing operation.

TABLE 3

Clearcoat With No Reduced Tungsten Oxide

| Time (sec.) | Coating Temp. (F.) |
|---|---|
| 0 | ~75 |
| 60 | 170 |

TABLE 4

Clearcoat With 1,480 ppm Reduced Tungsten Oxide

| Time (sec.) | Coating Temp. (F.) | Bottom Substrate Temp. (F.) |
|---|---|---|
| 0 | ~75 | ~75 |
| 60 | 246 | 125 |

TABLE 5

Clearcoat With 3,480 ppm Reduced Tungsten Oxide

| Time (sec.) | Coating Temp. (F.) |
|---|---|
| 0 | ~75 |
| 60 | 295 |

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A coated substrate comprising:
   a clear substrate; and
   an electrically conductive clear coating over at least a portion of the substrate, wherein the coating comprises a first electrically conductive clear layer and a second clear layer over at least a portion of the first layer, the second clear layer comprising:
   a binder; and
   infrared absorbing ultrafine non-stoichiometric tungsten oxide particles dispersed in the binder, wherein the ultrafine non-stoichiometric tungsten oxide particles are present in the second clear layer in an amount of from 200 to 5,000 parts per million.

2. The coated substrate of claim 1, wherein the ultrafine non-stoichiometric tungsten oxide particles are present in the second clear layer an amount greater than 500 parts per million of the clear layer.

3. The coated substrate of claim 1, wherein the coating allows greater than 20 percent transmission of near-IR radiation throughout a wavelength range of from 800 to 2,000 nanometers.

4. The coated substrate of claim 1, wherein the ultrafine non-stoichiometric tungsten oxide particles are of the formula $WO_x$ where $2.2 \leq x \leq 2.99$, and have an average primary particle size of no more than 200 nanometers.

5. The coated substrate of claim 1, wherein the first electrically conductive clear layer has an electrical resistance of less than $1.0 \times 10^{10}$ Ω/square.

6. The coated substrate of claim 1, wherein the first electrically conductive clear layer has an electrical resistance of from $10^8$ to $10^5$ Ω/square.

7. The coated substrate of claim 1, wherein the binder comprises polyurethane.

8. The coated substrate of claim 1, wherein the first electrically conductive clear layer is substantially free of the ultrafine non-stoichiometric tungsten oxide particles.

9. The coated substrate of claim 1, wherein the first electrically conductive clear layer comprises indium tin oxide, antimony tin oxide or a combination thereof.

10. The coated substrate of claim 1, further comprising at least one intermediate layer between the substrate and the first electrically conductive clear layer.

11. The coated substrate of claim 1, wherein at least the second clear layer is thermally cured by exposure to infrared radiation.

12. The coated substrate of claim 1, wherein at least the second clear layer is cured for a time of less than 1 hour.

13. The coated substrate of claim 1, wherein at least the second clear layer is cured at a temperature of from 50 to 150° C.

14. The coated substrate of claim 1, wherein the substrate comprises a polymer.

15. The coated substrate of claim 1, wherein the substrate comprises polycarbonate.

16. The coated substrate of claim 1, wherein the ultrafine non-stoichiometric tungsten oxide particles have an average aspect ratio of no more than 2:1.

17. The coated substrate of claim 16, wherein the ultrafine non-stoichiometric tungsten oxide particles are substantially spherical.

18. The coated substrate of claim 1, wherein the coating is transparent in a visible wavelength region of from 200 to 800 nanometers and in a near-IR wavelength region of from 800 to 2,000 nanometers.

19. A method of applying an electrically conductive clear coating on a substrate comprising:
   applying a clear coating comprising a binder and ultrafine non-stoichiometric tungsten oxide particles onto the substrate; and
   subjecting the applied clear coating composition to infrared radiation to thereby heat and thermally cure the clear coating composition to thereby produce a coated substrate of claim 1.

20. The method of claim 19, wherein the curing step is performed for a period of time of less than 1 hour.

21. The method of claim 19, wherein the infrared radiation heats the clear coating composition to a temperature of greater than 50° C.

22. The method of claim 19, wherein the infrared radiation is applied for a period of time of between 1 second and 30 minutes, and heats the clear coating composition to a temperature of between 50 and 150° C.

23. The method of claim 19, wherein the infrared radiation heats the clear coating composition to a temperature at least 10° C. above a temperature of the substrate during the curing step.

24. The method of claim 19, wherein the electrically conductive clear coating has an electrical resistance of less than $1.0 \times 10^{10}$ Ω/square.

25. The method of claim 24, further comprising applying an electrically conductive clear coating onto the substrate prior to the step of applying the clear coating composition onto the substrate.

26. A method of curing a clear coating composition applied to a substrate, the method comprising subjecting the clear coating composition to infrared radiation to thereby heat the clear coating composition to a curing temperature of at least 50° C. while maintaining the substrate at a temperature at least 10° C. less than the curing temperature of the clear coating composition, wherein the resultant coated substrate has a surface resistance of less than $1.0 \times 10^{10}$ Ω/square to thereby produce a coated substrate of claim 1.

27. The method of claim 26, wherein the clear coating composition is subjected to the infrared radiation for a time of less than 1 hour.

* * * * *